(12) United States Patent
Chaiko

(10) Patent No.: US 6,790,896 B2
(45) Date of Patent: Sep. 14, 2004

(54) COMPOSITE MATERIALS WITH IMPROVED PHYLLOSILICATE DISPERSION

(75) Inventor: David J. Chaiko, Naperville, IL (US)

(73) Assignee: The University of Chicago, Chicago, IL (US)

( * ) Notice: Subject to any disclaimer, the term of this patent is extended or adjusted under 35 U.S.C. 154(b) by 148 days.

(21) Appl. No.: 10/100,381

(22) Filed: Mar. 18, 2002

(65) Prior Publication Data

US 2003/0176537 A1 Sep. 18, 2003

(51) Int. Cl.$^7$ ................................................ C08K 3/34
(52) U.S. Cl. ...................... 524/445; 524/447; 524/449; 524/451
(58) Field of Search ................................. 524/497, 445, 524/446, 447, 449, 186, 488; 501/148

(56) References Cited

U.S. PATENT DOCUMENTS

| | | | | |
|---|---|---|---|---|
| 3,977,594 A | * | 8/1976 | Swan ........................ 229/109 |
| 4,412,018 A | * | 10/1983 | Finlayson et al. ............ 523/508 |
| 4,434,075 A | * | 2/1984 | Mardis et al. ............... 516/100 |
| 4,435,217 A | * | 3/1984 | House ...................... 106/181.1 |
| 4,517,112 A | * | 5/1985 | Mardis et al. ............... 516/100 |
| 4,810,734 A | * | 3/1989 | Kawasumi et al. .......... 523/216 |
| 5,552,469 A | * | 9/1996 | Beall et al. ................. 524/445 |
| 5,554,670 A | * | 9/1996 | Giannelis et al. ........... 523/209 |
| 5,582,638 A | * | 12/1996 | Coutelle et al. ........ 106/287.23 |
| 5,645,758 A | * | 7/1997 | Kawasumi et al. ..... 252/299.01 |
| 5,698,624 A | * | 12/1997 | Beall et al. ................. 524/445 |
| 5,726,247 A | * | 3/1998 | Michalczyk et al. ......... 525/102 |
| 5,747,560 A | * | 5/1998 | Christiani et al. ........... 523/209 |
| 5,840,796 A | * | 11/1998 | Badesha et al. ............. 524/449 |
| 5,876,812 A | * | 3/1999 | Frisk et al. ................. 428/35.7 |
| 5,910,523 A | * | 6/1999 | Hudson ...................... 523/213 |
| 5,962,553 A | * | 10/1999 | Ellsworth ................... 523/216 |
| 6,034,163 A | * | 3/2000 | Barbee et al. ............... 524/445 |
| 6,036,765 A | * | 3/2000 | Farrow et al. ............... 106/487 |
| 6,043,300 A | * | 3/2000 | Santhanam ................. 523/455 |
| 6,060,549 A | * | 5/2000 | Li et al. ..................... 524/445 |
| 6,084,019 A | * | 7/2000 | Matayabas et al. ......... 524/445 |
| 6,103,817 A | * | 8/2000 | Usuki et al. ................ 524/574 |
| 6,136,908 A | * | 10/2000 | Liao et al. .................. 524/445 |
| 6,156,835 A | * | 12/2000 | Anderson et al. ........... 524/445 |
| 6,172,121 B1 | * | 1/2001 | Chaiko ...................... 516/101 |
| 6,225,374 B1 | * | 5/2001 | Vaia et al. .................. 523/216 |
| 6,271,297 B1 | * | 8/2001 | Ishida ........................ 524/445 |
| 6,271,298 B1 | * | 8/2001 | Powell ....................... 524/445 |
| 6,380,295 B1 | | 4/2002 | Ross et al. |
| 6,407,155 B1 | * | 6/2002 | Qian et al. .................. 524/445 |

OTHER PUBLICATIONS

Jordan John W., "Organophilic Bentonites" J Phys Colloid Chem., vol. 53, pp 294–306, 1949.*

Kawasumi, M., et al. "Liquid Crystalline COmposite Based on a Clay Mineral" Mol. Crys. Liq. Cryst., Col. 281, pp 91–103.*

Kawasumi, M. et al., "Preparation and Mechanical Properties of Polypropylene–Clay Hybrids" Macromolecules, vol. 30, pp 6333–6338, 1997.*

Hasegawa, N. et al "Preparation and Mechanical Properties of Polypropylene–Clay Hybrids Using a Maleic Anhydride–Modified Polypropylene Oligomers" J Appl. Poly. Scie., vol. 67, pp 87–92, 1998.*

* cited by examiner

Primary Examiner—Kat Wyrozebski
(74) Attorney, Agent, or Firm—Foley & Lardner LLP

(57) ABSTRACT

The present invention provides phyllosilicates edge modified with anionic surfactants, composite materials made from the edge modified phyllosilicates, and methods for making the same. In various embodiments the phyllosilicates are also surface-modified with hydrophilic lipophilic balance (HLB) modifying agents, polymeric hydrotropes, and antioxidants. The invention also provides blends of edge modified phyllosilicates and semicrystalline waxes. The composite materials are made by dispersing the edge modified phyllosilicates with polymers, particularly polyolefins and elastomers.

73 Claims, 2 Drawing Sheets

COMPOSITE MATERIALS WITH IMPROVED PHYLLOSILICATE DISPERSION

STATEMENT REGARDING FEDERALLY SPONSORED RESEARCH

The U.S. Government has rights in this invention pursuant to Contract No. W-31-109-ENG-38 between the United States Department of Energy and the University of Chicago representing Argonne National Laboratory.

FIELD OF THE INVENTION

This invention relates to phyllosilicates which have been modified to increase their dispersibility in polymers and methods for producing the same. More particularly, the present invention relates to mineral fillers which have been edge modified to improve their dispersibility in polymer matrices and methods for making composite materials using the mineral fillers.

BACKGROUND OF THE INVENTION

Mineral fillers are used extensively to enhance the performance of a wide range of thermoplastic and thermosetting polymers. Physical properties which are improved by fillers include stiffness, strength, impact and temperature resistance, improved dimensional stability, surface hardness and scratch resistance. Other properties improved with fillers include improved chemical resistance, electrical resistance, and flame retardancy. Mineral fillers can also be used to reduce the thermal expansion coefficient of thermoplastics and permeability to gases and liquids. The most commonly used mineral fillers in plastics are calcium carbonate, wollastonite, silica, and the phyllosilicates such as kaolin, talc, and mica. Talc is unique in that its surface is naturally hydrophobic and therefore compatible with olefinic polymers. On the other hand, calcium carbonate, silica, wollastonite and the other phyllosilicates are hydrophilic and must be surface treated in order to improve their dispersion and interaction with the polymer matrix. The surface treatment of hydrophilic phyllosilicates includes reaction of the basal surface of the mineral with organosilanes, modified oligomers and polymers containing anhydride functional groups, and a wide variety of surfactants. Maximum improvement in mechanical and barrier properties of polymers occurs with the use of well-dispersed platy minerals possessing high aspect ratios. and small particle sizes. The aspect ratios of platy minerals such as mica, talc and kaolin are typically in the range of 30 to 100.

Since the late 1980's the focus of much research around the world has shifted from the traditional mineral fillers to the incorporation of fully exfoliated smectite clays, primarily montmorillonite with its extremely high aspect ratio, into a variety of thermoset and thermoplastic polymers. The aspect ratios of exfoliated smectite clays can range from 100 to 1,000 or more. The exfoliation and nanoscale dispersion of small amounts of smectite clays into polymers leads to composite materials with enhanced physical features, but with significant reductions in weight as compared to traditional mineral-filled polymers. Like the other hydrophilic phyllosilicates, the smectite clays must be surface-treated to render them compatible with olefinic polymers. The approach that has been most often used is based on the technology utilized for the last fifty years to make organoclays as Theological control agents in paints, inks, greases, etc. This approach utilizes quaternary amine-based surfactants to render the basal surface of the clay compatible with the polymer matrix. Various high-molecular-weight quaternary ammonium salts have been used such as dimethyl dihydrogenated tallow ammonium chloride, dimethyl benzyl hydrogenated tallow ammonium chloride, and methyl benzyl dihydrogenated tallow ammonium chloride. Other onium ions that have been used include the phosphonium and sulfonium groups. Surprisingly, this approach has not been very successful in promoting clay exfoliation in olefinic polymers such as polyethylene and polypropylene and their copolymers.

In any organoclay application, and especially in the preparation of composite materials, obtaining a good dispersion of the clay has always been problematic. Smectite clays have extremely large surface areas and because of their nanoscale their behavior is dominated by a complex balance of surface chemical forces. It is well known to those skilled in the art that maximum organoclay dispersion in organic solvents requires the addition of low-molecular-weight polar organic compounds. Various "polar activators" as they are called, have been recommended and include low-molecular-weight ketones and alcohols—with methanol and acetone being preferred. The polar activators are typically combined with small amounts of water and are used at levels ranging from 20 to 60 weight percent relative to the weight of the organoclay. Propylene carbonate has been recommended where the volatility of the activator is a concern. It is believed that the polar organic compounds encourage delamination and dispersion of the organoclay by solvating the high-molecular-weight ammonium ion at the basal surface of the organoclay which in turn affects the inter-platelet associations (i.e., basal spacing) resulting from the van der Waals attractions between surfactant chains and the clay surface. In rheological applications, a small amount of water is added with the polar activator to promote gellation via hydrogen-bond bridging between hydrophilic platelet edges. To this end, full rheological effectiveness requires unobstructed access to the hydrogen bonding sites on the clay edges. In composite material applications, the organoclay designs traditionally left the platelet edges untreated with the belief that the edge contribution to the hydrophilic lipophilic balance (HLB) of the organoclay is insignificant.

Pioneering work in the 1940s showed that increasing chain length of the amine and increasing amine loading leads to more complete coverage of the basal clay surface. This work is discussed in J. W. Jordan, B. J. Hook, and C. M. Finlayson, J. Phys. Colloid Chem. 54, 1196–1208 (1950). For example, approximately 80 percent of the basal surface is covered by amine molecules lying flat at an octadecylamine loading of 100 milliequivalents per 100 g of clay. However, maximum solvation of the hydrocarbon chains of the amine would require the hydrocarbon chain to lift off from the clay surface thereby exposing a hydrophilic, silicate surface. Jordan postulated that the polar organic activators facilitated the solvation of the hydrocarbon chains by simultaneously lifting the hydrocarbon chains on end and shielding the exposed silicate surface.

Self-activating organoclays have been described in the patent literature and represent an improvement in performance. Self-activation has been achieved through various approaches including manufacturing and compositional modifications. For example, a common approach is to overtreat the clay with a 10 to 25 percent excess of the quaternary amine above the ion exchange capacity of the clay. To maximize the self-activating characteristic, this treatment approach usually requires that amine exchange of the clay be carried out in the presence of low-molecular-weight polar activators such as alcohols, ketones, ethers, carboxylic acids, carboxylic esters, and amides. In a slight variation on his approach, higher molecular weight anionic compounds such as carboxylic acids having low water solubility have been used as self-activating agents in conjunction with amine treatment. In this approach, the anionic carboxylic acid forms a water-insoluble complex with the ammonium ion which then attaches to the basal surface of the clay leaving the edge unobstructed.

Analogous approaches have been used to enhance the exfoliation of organoclays during the preparation of a variety of clay/polymer composite materials wherein a high-molecular-weight polar compound is used to activate the organoclay. Examples of activators which also function to compatibilize the organoclay with the polymer matrix include, polyolefin oligomers with telechelic OH groups and maleic anhydride-modified polyolefin oligomers. Oligomeric activators have been used at levels comparable to those of the low-molecular-weight polar activators, i.e., 30 to 100 weight percent relative to the weight of the organoclay. Because of the higher molecular weight of the oligomeric activators, the total organic loading on the organoclay necessary to achieve the desired degree of exfoliation exceeds 70 to 75 weight percent relative to the weight of the organoclay making this approach both expensive and inefficient. In addition, organic solvents are often required to facilitate intercalation of the oligomer which increases cost and manufacturing difficulty. Additionally, the efficiency with which the high-molecular-weight compatabilizers increase the basal spacing of the organoclay is surprisingly low. For example, telechelic polyolefins reportedly increase the basal spacing of an amine-treated montmorillonite from 33 Å to only 38 Å at a mixture ratio of 1:1. This small increase in basal spacing suggests that not all of the oligomer becomes intercalated within the organoclay gallery. Because of the polar functional groups employed by this approach, it is not unreasonable to presume that a portion of the oligomer attaches to the edge of the clay and may actually block access to the organoclay galleries.

Prior art has focused almost exclusively on the modification of the basal surfaces of the phyllosilicates. The reasonableness of this approach has been supported by the fact that the basal surface comprises over 95 percent of the total surface area of smectite clays. Hence, any affect that the edge surface area might have on dispersion behavior was believed to be inconsequential. However, phyllosilicates have a tendency to stack in ordered arrays called booklets. This stacking means that prior to exfoliation the contribution of the edge surface area to the overall surface area is not insignificant. Unfortunately, ways to address this issue have not been forthcoming in the literature. Additionally, under current methods, large quantities of volatile, low-molecular-weight, polar activators are required to ensure complete exfoliation of organoclays in nonpolar systems. In the formation of clay/polymer composite materials, the volatile, low-molecular-weight, polar activators are undesirable and are replaced by surface-active oligomers. However, the amount of oligomeric activator required is 30 to 100 weight percent, or more, relative to the weight of the organoclay making the approach impracticable.

One approach to designing organoclays that does not focus solely on basal surface modification can be found in U.S. Pat. No. 4,412,018. This patent describes the treatment of the clay edge with anionic polyacrylates to facilitate exfoliation in slightly polar polymers. While the approach of using a polymeric dispersant is claimed to enhance exfoliation in nylon, it is not well suited to yield an improvement in nonpolar polymers, such as polyolefins. This is because the use of polymeric dispersants makes it difficult to precisely control charge location and charge density, which directly influence the surface HLB value of organoclays.

Thus a need exists for a method of increasing the dispersibility of organoclays in polymer systems without the need for large quantities of traditional polar organic activators.

SUMMARY OF THE INVENTION

The present invention provides a method for producing edge modified phyllosilicates which includes the steps of adsorbing organic surfactants, such as organophosphorous compounds and/or organosulfur compounds, onto the edge of a phyllosilicate. The invention also provides a method for producing composite materials from the edge modified phyllosilicates which includes the step of dispersing the edge modified phyllosilicate in a polymer. The invention also provides organophyllosilicates and composite materials made from the edge modified phyllosilicates.

In addition to the use of edge modification, the present invention overcomes the problems associated with the design and production of highly dispersible organoclays through the use of surface HLB modifying agents and polymeric hydrotropes which are capable of producing enhanced swelling capabilities in nonpolar systems at relatively low polymer loadings. More particularly, the present method provides organoclays which have a wide variety of uses including uses as water treatment and rheological control agents, but are particularly suited to the preparation of polyolefin-based composite materials. The present method is particularly valuable because it produces a self-activated organoclay having an expanded basal spacing with only a minor increase in organic loading.

One aspect of the present invention provides an edge modified organophyllosilicate made from a phyllosilicate having an edge modifying surfactant adsorbed along its edges to render the phyllosilcate platelet edges organophilic (i.e. hydrophobic). This can be accomplished by dispersing a phyllosilicate in a suitable solvent, such as water, along with an anionic surfactant which adsorbs preferentially to the edges of the phyllosilicate. In one embodiment of the invention the surface of the phyllosilicate is substantially free of surface HLB modifying agents. In this embodiment the phyllosilicate may be either a phyllosilicate that is able to undergo ion-exchange (hereinafter an "ion exchangeable phyllosilicate"), such as a smectite clay or mica, or a phyllosilicate that is substantially unable to undergo ion-exchange (hereinafter a "non ion exchangeable phyllosilicate"), such as a kaolinite clay or talc or smectite clays with naturally low exchange capacities. As used herein, the phrase substantially non ion exchangeable means a clay having an ion exchange capacity of less than about 70 milliequivalents per 100 grams of clay.

In another embodiment, the present method involves adsorbing a surface HLB modifying agent and, optionally, a polymeric hydrotrope onto the surface of a naturally hydrophilic phyllosilicate, such as an ion exchangeable phyllosilicate, to render the surface of the phyllosilicate more hydrophobic. For phyllosilicates that contain exchangeable cations, the basal surface of the phyllosilicate can be modified by cation exchange in the presence of a nonionic polymeric hydrotrope. In this embodiment, the edge treatment may be performed before or after the basal surface modification, but is more preferably carried out prior to basal surface modification. The polymeric hydrotrope can be adsorbed in an amount from about 0.1 weight percent to about 10 weight percent relative to the weight of the clay.

Once the edge- and basal surface-modified clays have been formed in dispersion, the resulting hydrophobic organoclay can be separated by filtration, washed with water to remove excess salt resulting from the cation exchange, and dried to a desired solvent content. The organoclay can then be dispersed into a compatible solvent including desired organic solvents or used in the preparation of composite materials.

Suitable ion exchangeable phyllosilicates for use in the present invention include the smectite clays, which may have exchange capacities of at least 75 milliequivalents per 100 g of clay. Another ion exchangeable clay that is suitable for use with the invention is mica. Non-limiting examples of smectite clays include hectorite, montmorillonite, beidelite, stevensite, nontronite, and saponite. Synthetic clays are also acceptable. Suitable non ion exchangeable phyllosilicates for use in the present invention include kaolinite clays and talc. Since the kaolins and talcs do not possess a significant number of ion exchange sites on their basal surfaces, these minerals are suitably modified for composite material applications by treatment of the platelet edges with anionic surfactants without treatment of the basal surfaces via cation exchange and hydrotrope adsorption.

The present organically modified phyllosilicates can be used in many applications where phyllosilicates, and in particular hydrophobic phyllosilicates, are desired. Such applications include use as solvent thickeners, gelling agents and the like.

The above described embodiments are set forth in more detail in the following description and illustrated in the drawings described hereinbelow.

DETAILED DESCRIPTION OF THE INVENTION

Figure 1:
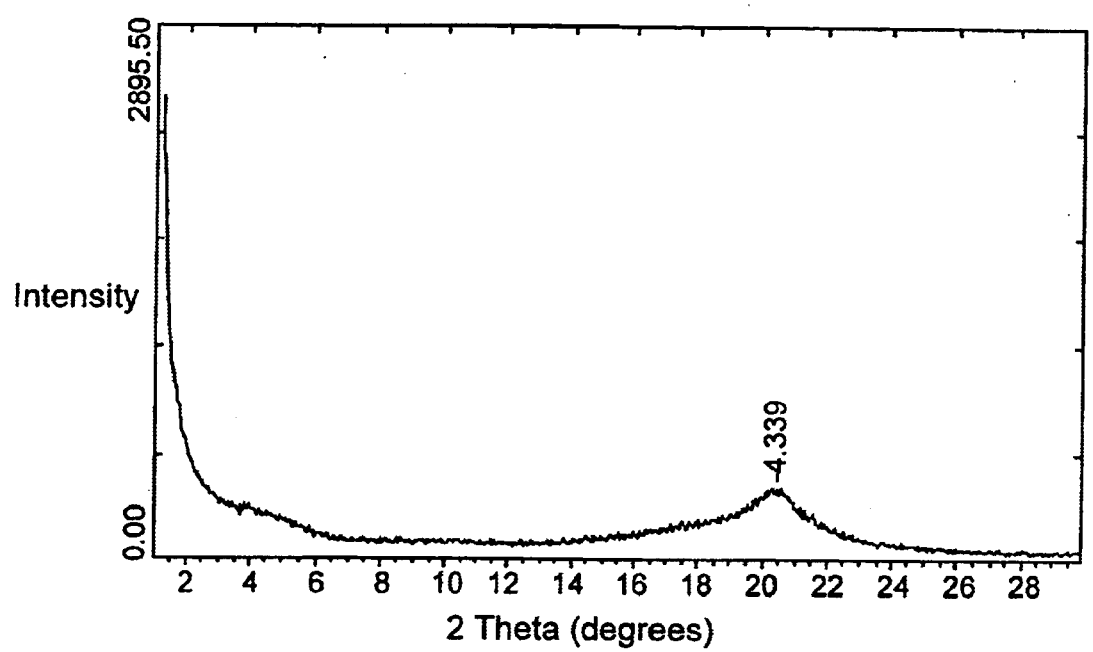
FIG. 1 is an x-ray diffraction pattern showing the lack of a basal spacing in a clay/EVOH composite material film prepared according to Example 18.

The present invention provides edge modified phyllosilicates, composite materials made from edge modified phyllosilicates, and methods for making the same. More specifically, the invention provides for the edge modification of phyllosilicates using various organophosphorous and organosulfur compounds.

One aspect of the present invention provides organophyllosilicate particles that are edge modified with various organic anionic surfactants that adsorb preferentially to the edges of the phyllosilicates. This includes embodiments wherein the anionic surfactant attaches only to the edges of the phyllosilicate particles or platelets and not the basal surface of the phyllosilicate particles. Evidence for this mode of attachment is provided by experiments which demonstrate that no change in the basal spacing of the treated clay is detectable when so treated. These experiments are discussed in detail in examples 8 and 9 in the examples section below.

Generally greater than 90% of the surface area of the phyllosilicate particle is made up of basal surface. For that reason, much of the effort of modifying the hydrophilicity/hydrophobicity characteristics of the phyllosilicate have focused on modifying the basal surface. With the present organophyllosilicates, it has been discovered that basal surface modification of the phyllosilicate in conjunction with edge modification using anionic surfactants leads to dramatic improvements in the dispersion of smectite clays in organic solvents, including polymer matrices. Moreover, it has been discovered that edge treatment with anionic surfactants alone is sufficient to dramatically improve the dispersion of non ion exchangeable phyllosilicates, naturally hydrophobic phyllosilicates, and even ion exchangeable phyllosilicates in polyolefins. In addition it has been demonstrated that organophosphorous and organosulfur compounds enhance the dispersibility of phyllosilicates to a greater degree than high charge density polymers, such as polyacrylates. In has also been discovered that the edge treatment of talcs and kaolins leads to increased effective aspect ratios for these clays in polyolefin dispersions.

The approach embodied by the present invention differs from other approaches that use anionic surfactants to modify the surfaces, rather than the edges, of phyllosilicates. For example, methods of treating clay surfaces, such as those disclosed in U.S. Pat. No. 4,412,018, use anionic surfactants to activate the clay by formation of an anion-cation complex which is adsorbed onto the basal surface of the clay. In this approach, the cationic surfactant, usually a quaternary amine, is present in an amount sufficient to at least satisfy the cation exchange capacity of the clay, plus an amount necessary to complex all of the anionic surfactant. This approach requires that the edge of the clay be kept clear of any blocking agents to allow water adsorption and thereby develop full capability as a rheology modifier. In the present invention, the basal surface of the clay is treated with a cationic surfactant that is present in an amount that is less than or equal to the cation exchange capacity of the clay thereby leaving the anionic surfactant uncomplexed and free to adsorb onto the edge of the clay.

Without limiting the scope of this invention, it is believed that the reason edge modification is successful is because the contribution of the edge surface area to the overall surface area prior to dispersion is not insignificant, as was previously thought. Initially the phyllosilicate particles are stacked in ordered arrays called booklets. It is believed this booklet structure presents a high-energy barrier at the gallery edges that blocks the first step of exfoliation, i.e. the intercalation of the polyolefin within the phyllosilicate galleries, because the first surface encountered in separating the booklets are the edges of the phyllosilicates. Modifying the edges of the phyllosilicate is believed to help overcome this initial energy barrier thereby facilitating dispersion of the phyllosilicate particles.

Suitable phyllosilicates for use in the invention are clays, including mica, kaolinite, and smectite clays, and naturally occurring hydrophobic minerals, such as talc. Suitable smectite clays include montmorillonite, hectorite, saponite, sauconite, beidellite, nontronite and synthetic smectites such as Laponite®. As will be well understood by one skilled in the art, the phyllosilicates discussed herein inherently have basal surfaces and are arranged in layers of particles which are stacked on top of one another. The stacking of the clay particles provides interlayers, or galleries, between the phyllosilicate layers. These galleries are normally occupied by cations, typically comprising sodium, potassium, calcium, magnesium ions and combinations thereof, that balance the charge deficiency generated by the isomorphous substitution within the clay layers. Typically, water is also present in the galleries and tends to associate with the cations. The distance between the basal surfaces of adjacent phyllosilicate layers is referred to as the basal spacing.

Typically, surfactants that modify the edges of phyllosilicate particles and not their basal surfaces are anionic organic molecules. These surfactant type modifiers are superior to the polymeric based dispersants that are currently used as edge modifiers. Polymeric-based dispersants are well known in the art and include most notably the polyacrylates, polyacrylate copolymers, polyacrylamides, and the like. These types of polymeric dispersants are generally used to improve particle dispersion in aqueous systems and typically have molecular weights of 100,000 or less, more preferably have molecular weights of 20,000 or less, and most preferably between 15,000 and 5,000. Clay dispersion is enhanced by edge modification through the development of an increased negative charge on the edge of the clay platelets which reduces the tendency for particle agglomeration due to charge repulsion and steric repulsion. However, because these polymeric modifiers generally have a high charge density spread along their polymer backbones, the use of polymeric dispersants makes it difficult to precisely control charge location and charge density, which will directly influence the surface HLB value of the organophyllosilicate. On the other hand, the surface HLB value of the organophyllosilicate can be more precisely controlled by varying the concentration and HLB value of a surfactant-type modifier, particularly where the surfactant modifier has its charge density concentrated around a charged head group.

Suitable organic surfactant edge modifiers for use in the present invention include organophosphorous and organosulfur compounds, particularly the following:

a) phosphonic acids with the formula $$R-\overset{O}{\underset{OH}{\overset{\|}{P}}}-OH$$

b) phosphonic acids with the formula $$R-\overset{O}{\underset{OR}{\overset{\|}{P}}}-OH$$

c) phosphinic acids with the formula $$R-\overset{O}{\underset{R}{\overset{\|}{P}}}-OH$$

d) phosphoric acid esters with the formula $$RO-\overset{O}{\underset{OH}{\overset{\|}{P}}}-OH$$

e) phosphoric acid diesters with the formula $$RO-\overset{O}{\underset{OR}{\overset{\|}{P}}}-OH$$

f) phosphorous acid diesters with the formula $$RO-\overset{OH}{\overset{|}{P}}-R$$

g) diphosphonic acids with the formula $$HO-\overset{O}{\underset{OH}{\overset{\|}{P}}}-R-\overset{O}{\underset{OH}{\overset{\|}{P}}}-OH$$

h) pyrophosphoric acid diesters with the formula $$RO-\overset{O}{\underset{OH}{\overset{\|}{P}}}-O-\overset{O}{\underset{OH}{\overset{\|}{P}}}-OR$$

i) thiophosphonic acids with the formula $$R-\overset{O}{\underset{R}{\overset{\|}{P}}}-SH$$

j) dithiophosphonic acids with the formula $$R-\overset{S}{\underset{R}{\overset{\|}{P}}}-SH$$

where R is an alkyl or hydroxyalkyl group with 1 to 50 C atoms or an aryl or hydroxyaryl group with 6 to 12 C atoms. Additionally, the R group may include oligomers comprised of two or more chemical species. Nonlimiting examples include polyethylene/poly(ethylene glycol), polyethylene/polypropylene, poly(dimethylsiloxane)/poly(alkymethylsiloxane), polyethylene/polybutylene, polyethylene/polybutene, polypropylene/polybutene, polystyrene/polybutadiene.

One of skill in the art will recognize that the HLB of the anionic edge modifier should be chosen such that it is sufficient to render the edge treated organophyllosilicates sufficiently hydrophobic to be dispersible in an organic medium, such as a polymer. Thus, a modifier having a lower HLB value may be required for a naturally hydrophilic organoclay, particularly a naturally hydrophilic organoclay that is not surface treated, than for a naturally hydrophobic phyllosilicate. Similarly, an edge modifier having a lower HLB value may be required for any phyllosilicate that is only edge modified compared to a phyllosilicate that is edge and surface modified. This is illustrated in examples 11 through 13 below which demonstrate that a decrease in the molecular weight of an edge modifier (i.e. an increase in the HLB) results in a decrease in the dispersibility of the edge modified clay in an organic medium.

Briefly, the process used to make the edge modified, ion exchangeable phyllosilicates begins by dispersing the phyllosilicate in water at a solids concentration sufficient to provide a clay concentration of about 1 to 5 weight percent. Higher clay concentrations may be employed in the presence of an appropriate dispersant, however, the final clay concentration prior to ion exchange is preferably 1 to 2.5 weight percent.

If the phyllosilicate is a non ion exchangeable phyllosilicate the concentration of the phyllosilicate in the dispersion can be considerably higher. In some embodiments the non ion exchangeable phyllosilicate is present in the dispersion at a solids concentration sufficient to provide a clay concentration of about 50 to about 70 weight percent. This includes embodiments where the phyllosilicate is present in the dispersion at a solids concentration sufficient to provide a clay concentration of about 25 to about 35 weight percent.

Optionally, the dispersed clays may be purified. High shear, followed by particle size separation methods including screens, hydrocyclones, and centrifuges may be used to separate the clay from mineral impurities. Mineral impurities may include non-clay silicates (e.g., quartz, cristobalite, opal, talc, mica, wollastonite, spodumene, etc.) metal hydroxides (e.g., gibbsite, brucite, etc., carbonates (e.g., calcite, dolomite, etc.) sulfates (e.g., gypsum, alunite, barite, etc.) and phosphates (e.g., all minerals of the apatite group). Preferably the clay is purified to greater than 95% and more preferably to greater than 98%. In one embodiment the clay has been pre-purified utilizing conventional techniques, however pre-purification is not required.

Once the organophyllosilicate is dispersed, an anionic edge modifying surfactant is added to the dispersion. The amount of edge modifying surfactant added is typically 0.1 to 10 weight percent relative to the weight of the phyllosilicate. This includes dispersions where the edge modifying surfactant is present in an amount between about 0.5 and about 4 weight percent relative to the weight of the phyllosilicate. In certain embodiments, the edge modifiers are present in an amount of less than 10 milliequivalents per 100 grams of clay. This includes embodiments where the edge modifiers are present in amounts less than 5 milliequivalents per 100 grams of clay.

Alternatively, phyllosilicates such as mica and kaolin may be produced by a dry method wherein the dry clay is mixed directly with the edge modifier. The edge modifier is typically prepared as either the free acid or the ammoniun salt in a suitable solvent such as isopropanol/water mixtures. Any mixer capable of handling high solids can be used to combine the clay and the reagents. Such mixers are well known in the art and include, but are not limited to, pug mills and extruders.

In various embodiments of the invention, in addition to edge modification, hydrophillic phyllosilicates, such as ion exchangeable phyllosilicates, are subjected to basal surface modification to produce clays having hydrophobic surfaces. Typically, this involves adsorbing an HLB modifying agent, which may be a surfactant, an oligomer, or a polymer, onto the basal surface of the phyllosilicate to produce a hydrophobic surface. Cation exchange is one approach that can be used to generate a hydrophobic surface. Cationic surfactants that will undergo ion exchange with the phyllosilicates are well known in the art and include, but are not limited to, amine salt-type, phosphonium salt-type, and sulfonium salt-type surfactants. Typically, the cationic surfactant is a quaternary ammonium salt that undergoes onium ion exchange with the phyllosilicate particles. Suitable ammonium surfactants for onium ion exchange are well known in the art and include, but are not limited to, dimethyl benzyl hydrogenated tallow ammonium, dimethyl benzyl octadecyl ammonium, methyl benzyl dihydrogenated tallow ammonium, dimethyl dihydrogenated tallow ammonium, trimethyl hydrogenated tallow ammonium, trimethyl octadecyl ammonium, dimethyl didodecyl ammonium, methyl trioctadecyl ammonium, dimethyl dioctadecyl ammonium, methyl tallow bis-2-hydroxyethyl ammonium, dimethyl dicoco ammonium, methyl dibenzyl coco ammonium, dibenzyl dicoco ammonium, tribenzyl coco ammonium, and mixtures thereof. Another approach to basal surface modification involves the adsorption of suitable, hydrophobic oligomers and polymers which contain polar functional groups that exhibit an affinity for the basal surface of the clay. Examples include polyethers, polyesters, polyurethanes, and polyamides. Adsorption of such polymers is described in U.S. Pat. No. 6,228,093, which is herein incorporated by reference.

In addition to ammonium salts, other suitable surfactants for basal surface modification include:

k) alkylphosphonium salts with the formula:

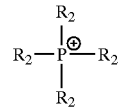

l) alkylsulfonium salts with the formula:

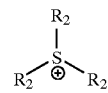

m) alkylisothiouronium salts with the formula:

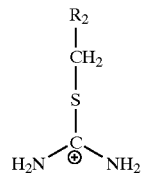

where $R_2$ is an alkyl or hydroxyalkyl group with 1 to 50 C atoms, such as 25 to 50 C, atoms or an aryl or hydroxyaryl group with 6 to 12 C atoms.

The alkylisothiouronium salts are particularly suitable as surface HLB modifying agents because, unlike the quaternary amines, the lack an alpha-hydrogen which may lead to thermal instability.

In various embodiments wherein the phyllosilicates are subject to cation exchange, the phyllosilicates are exposed to enough cationic surfactant to approximately satisfy the cationic exchange capacity of the phyllosilicates but not enough to complex all of anionic edge modifier. For dispersions in aliphatic solvents and polyolefins, the amount of cation in the dispersion should be enough to satisfy between about 50 and 100 percent of the cation exchange capacity of the phyllosilicates. This includes embodiments where the amount of cation is sufficient to satisfy between about 75 and 100 percent of the exchange capacity of the phyllosilicate. This has two advantages. First, it substantially eliminates excess cationic surfactant which is only loosely bound to the phyllosilicate surface and easily separates during processing and composite material formation, degrading the quality of the composite materials. Second, it prevents the anionic edge modifiers from complexing with all of the cationic surfactants, leaving at least some of the edge modifiers free to adsorb onto the phyllosilicate edges.

The present invention also encompasses embodiments wherein the organophyllosilicate particles are subject to basal surface modification with nonionic polymeric hydrotropes. The process used to produce hydrotrope-modified organoclays is described in detail in co-pending U.S. patent application Ser. No., 10/078,992, filed on Feb. 20, 2002, which is herein incorporated by reference. Briefly, adsorption of a polymeric hydrotrope on the basal surface of an edge modified clay is achieved by dispersing and/or dissolving a polymeric hydrotrope in the clay dispersion and allowing the hydrotrope to adsorb onto the surface of the dispersed, edge modified clay. The clay is also subject to cation exchange using a cationic surfactant, as described above. Cation exchange may take place after hydrotrope adsorption has occurred or as hydrotrope adsorption is occurring. In this latter embodiment, the clay is exposed to a solution containing a mixture of a polymeric hydrotrope and a cationic surfactant. This process produces a preactivated organoclay that can be dispersed in solvents and polymers without additional activators, coupling agents or compitabilizers as is the case with conventional organoclays, resulting in a significant reduction in the total organic loading of the organoclay. This has the advantage of making it possible to produce organoclays especially useful in the preparation of composite materials at a greatly reduced cost.

The effect of polymeric hydrotrope adsorption on organoclay exfoliation can be understood by comparing the structure of a hydrotrope-modified organoclay dispersed in a polymer, such as a polyolefin, to the lamellar liquid crystal (LLC) phases found in oil/water/surfactant systems. In these systems, the amphiphilic structure of the surfactant leads to structural ordering such that the hydrophilic head group is oriented toward the water interface while the hydrophobic portion of the surfactant molecule is oriented toward the oil interface. In the LLC phases, long-range orientational order gives rise to a two-dimensional lamellar structure in which the surfactant molecules are arranged in a bilayer that is stabilized by the intertwining non-polar chains of oppositely directed surfactant molecules. The polar head groups are separated by a layer of water that can vary between 10 Å and 100 Å, depending on the water concentration. It is well known from the surfactant literature that LLC's have a limited capacity to solubilize organics via intercalation of the hydrocarbon region of the LLC. Even in swollen LLC phases, where the hydrocarbon chains of the surfactant adopt a fully extended conformation, the terminal groups of the surfactant chains in adjacent surfactant monolayers remain in contact. This is now understood, from the surfactant literature, to be due to entropic effects wherein the surfactant chains exhibit an order parameter that is intermediate between that of a liquid and a solid. Hence, the LLC phase is not compatible with a bulk isotropic liquid hydrocarbon phase.

When an organic solvent is intercalated within the galleries of the organoclay, the alkyl chains of the onium ion lift off from the clay surface producing an LLC structure. In this system, the inherently hydrophilic and flexible phyllosilicate crystal lattice, which is approximately 10 Å thick, takes the place of the water layer in the oil/water/surfactant system. And just like the LLC phases, the organoclay analogues are highly viscous when the organoclay is fully exfoliated. While organoclays will spontaneously swell in the presence of a suitable organic solvent, the traditional organoclays will not spontaneously disperse into an excess of the organic solvent. In other words, the capacity of the organoclay to solubilize organics is limited. In this regard, the organoclays bear further resemblance to the LLC phases of oil/water/surfactant system. It can be expected that the same entropic effects that control swelling in LLC systems, present a thermodynamic barrier which prevents the unlimited swelling and spontaneous exfoliation of organoclays in polymer systems.

It is now understood from the surfactant literature that increased organic solubility in oil/water/surfactant systems can be achieved through the use of hydrotropes. The most effective hydrotropes are typically low-molecular-weight organic compounds that disrupt the normal surfactant packing geometry necessary for the formation of the lamellar structure. High-molecular-weight hydrotropes have also been discovered which lead to enhanced organic solubility in LLC phases, again by disrupting the alkyl chain packing within the LLC phase. The high-molecular-weight hydrotropes include the difunctional surfactants produced by Westvaco, of which dicarboxylic acid; 5-(and 6-)carboxy-4-hexyl-2-cyclohexene-1-yl octanoic acid is an example. While the incorporation of a hydrotrope can increase the solvating capacity of LLC phases, that capacity is not unlimited and the interlayer spacing does not normally exceed the length of the fully extended hydrocarbon chains. This situation is similar to that of the organoclay/hydrocarbon systems.

The most unusual LLC phases are those containing nonionic surfactants of the type n-alkyl polyethylene glycol ether. The lamellar phase of n-dodecyl tetraethylene glycol ether is reported to be capable of solubilizing alkyl hydrocarbons to such an extent that they form a liquid hydrocarbon layer between the layers of surfactant molecules thereby producing a hydrocarbon layer thickness of 60 Å. This exceptional capacity to solubilize hydrocarbons has been shown to be due to the high motional disorder of the surfactant hydrocarbon chains. In other words, the more liquid-like the surfactant chains, the more compatible they become with an isotropic oil layer.

The relevance of LLC phase behavior to the issue of organoclay exfoliation, and hence composite material formation, is two fold. For exfoliation to occur, the interfacial tension between the organoclay and the organic phase (i.e., polymer phase in composite material systems) must be low enough to permit wetting. However, in light of the previous discussion, this condition is not expected to be sufficient to promote exfoliation—a high motional disorder of the surfactant hydrocarbon chains is also required. The impact of surfactant order/disorder was in fact partially recognized by Jordan et al. who showed that parallel alignment of the organoclay platelets, which could result from mechanical working of the wet filter cake prior to and during drying, markedly diminished the dispersibility of the dried organoclay. This is discussed in detail in J. W. Jordan and F. J. Williams, Kollid Zeitschrift, 137, 40–48 (1954). The present invention is based in part on the discovery that the same entropic effects that control swelling in LLC systems, present a thermodynamic barrier which prevents the unlimited swelling and spontaneous exfoliation of organoclays in polymer systems and that organoclays incorporating hydrotropes exhibit superior swelling volumes in hydrocarbon solvents and spontaneous exfoliation in polymer systems. Organoclays incorporating hydrotropes would be expected to exhibit superior swelling volumes in hydrocarbon solvents. Additionally, the increased osmotic pressures within the organoclay galleries due to extensive swelling would be expected to aid particle dispersion and exfoliation.

Examples of suitable nonionic polymeric hydrotropes include, but are not limited to, polyvinyl alcohol, polyvinylpyrrolidone, polypropylene glycol, polybutylene glycol, methoxypolyethylene glycol, dimethoxypolyethylene glycol, polyethylene glycol, polyethylene glycol derivatives such as, polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, polyethylene glycol divinyl ether, as well as copolymers of polyethylene glycol/polypropylene glycol, and polyethylene glycol/polybutylene glycol, and mixtures thereof.

Other nonlimiting examples of polymeric hydrotropes include polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol and polypropylene glycol, and mixtures thereof.

Ion exchangeable phyllosilicates that are both edge- and hydrotrope-modified according to the present invention may be produced as follows. The first step in the production of the organophyllosilicates is the dispersion of an ion exchangeable phyllosilicate in water using high-shear mixing, with or without high temperatures. Elevated temperatures of 60° to 80° C., however, will greatly increase the rate and extent of clay hydration. Generally, the smectite clays can be dispersed in amounts up to about 5 weight percent in the water, although 2 to 3 weight percent smectite dispersions are suitable. After the phyllosilicate is dispersed in the water, the edges of the phyllosilicate particles are modified with an edge modifying surfactant by adding the appropriate edge modifiers to the dispersion. Typical surfactant edge modifier concentrations, relative to the weight of the phyllosilicate are 0.1 to 10 weight percent although 0.5 to 4 weight percent are suitable. The basal surface of ion exchangeable phyllosilicates can be modified at this time by onium exchange and hydrotrope adsorption. The extent of ion exchange will be dictated by the degree of hydrophobicity desired. For dispersion in aliphatic solvents and polyolefins the onium exchange will typically be between 75 to 100 percent of the exchange capacity of the smectite clay. Although it is preferred to modify the edge of the phyllosilicate prior to basal surface modification, these steps can occur in any order to achieve the present organophyllosilicates. Similarly hydrotrope adsorption at the basal surface may occur before cation exchange at the basal surface by adding the hydrotrope to the dispersion prior to adding the cations. Alternatively, the two processes may occur substantially simultaneously by exposing the organoclays to a solution that containing the hydrotrope and the cations. In one embodiment the hydrotrope is added in an amount from 0.5 to about 10 weight percent preferably 0.5 to 5 weight percent, relative to the weight of the dispersed phyllosilicate.

Edge-modified, non ion exchangeable phyllosilicates can be produced as follows. The first step in the production of the organophyllosilicates is the dispersion of an ion exchangeable phyllosilicate in water using high-shear mixing, with or without high temperatures. Elevated temperatures of 60° to 80° C., however, will greatly increase the rate and extent of clay hydration. Generally, the non ion exchangeable phyllosilicates, such as kaolinite and talc, can be dispersed in amounts up to 50 to 70 weight percent or higher, although 25 to 35 weight percent dispersions are suitable, to create a slurry. These slurries can then be conveniently blended with the appropriate edge-treatment modifier by extrusion mixing followed by drying at elevated temperatures. Typical surfactant edge modifier concentrations in the slurry, relative to the weight of the phyllosilicate are 0.1 to 10 weight percent although 0.5 to 4 weight percent are suitable.

The performance of the edge modified phyllosilicates is illustrated in the examples provided below. In particular, comparative Example B demonstrates superiority of the edge modifiers of the present invention over more conventional polymer-type edge modifiers. Specifically, the data show that the settling volume of an organoclay treated with 1-hydroxydodecane-1,1-diphosphonic acid has a settling volume in heptane that is about 2.8 times larger than an organoclay treated with a polyacrylic acid, which is consistent with a higher dispersibility for the surfactant treated clay.

In one variation of the invention, the edge modified phyllosilicate is blended with a natural or synthetic semicrystalline wax, rather than being exposed to a polymeric hydrotrope activator in a dispersion, to form a master batch. In this embodiment the wax acts as a hydrotrope and can simultaneously activate the basal surface of the organoclay and swell the galleries. Typically, the amount of phyllosilicate will make up between about 20 and about 75 weight percent of the master batch composition. Examples of natural waxes include, but are not limited to, paraffin, microcrystalline montan, and vegetable waxes. Examples of synthetic waxes include, but are not limited to, Fisher-Tropsch, polyethylene, polypropylene, polymethylene, chemically modified waxes, and polymerized alpha-olefins. Specific examples of suitable semicrystalline waxes include, but are not limited to polyethylene-block-polyethylene glycol. The waxes are used as swelling agents which provide the organoclays in a pelletized form, which makes them easier to handle and speeds the rate of clay exfoliation in polyolefins and other polymers. When the organoclays of the present invention are combined with small amounts of waxes, a transparent, extrudable LLC phase is produced.

Another aspect of the present invention provides composite materials made from the above-described edge- and hydrotrope-modified organophyllosilicates. These composite materials are produced by dispersing a organophyllosilicate in a polymer. The polymer may be any thermoplastic or thermoset polymer which is capable of solvating the phyllosilicates. This includes elastomers and nonpolar polymers, such as polyolefins. Methods for dispersing organophyllosilicates in polymer melts are known in the art and include a variety of mixers and extruders. Typically, the clay loading in the polymer will between about 0.1 and about 10 weight percent.

Polymers in which the present organophyllosilicates can be dispersed include polyolefins, such as polyethylene, polypropylene, ethylene-propylene copolymers, ethylene-propylene-diene terpolymers, copolymers such as poly (ethylene-co-vinyl acetate), poly(ethylene-co-vinyl alcohol), poly(ethylene-co-vinyl acetate-co-methacrylic acid), poly(ethylene-co-methacrylate), poly(ethylene-co-methacrylic acid), poly(methyl methacrylate), and elastomers such as polyisobutylene, polyisoprene, polybutadiene, poly(styrene-butadiene-styrene), poly (styrene-co-acrylonitrile), poly(acrylonitrile-co-butadiene-co-styrene), polystyrene, polyvinylchloride, cellulose acetate, cellulose acetate butyrate, cellulose propionate and the like. The organophyllosilicates of the present invention may also be dispersed in a variety of monomers including styrene, methyl methacrylate, butadiene, vinyl acetate, acrylonitrile and the like which may then be polymerized by appropriate methods known to those skilled in the art. The present organophyllosilicates are particularly well suited for dispersion into polymer matrices to form composite materials.

One measure of an organoclay's ability to form a composite material is the color of a dispersion of the clay in a hydrocarbon solvent. For clays such as montmorillonite which contain iron, a white opaque dispersion indicates poor organoclay solvation while a clear green color indicates good solvation has occurred. For example, when dispersing conventional organoclays, such as Cloisite® 20A in hydrocarbons, color changes in the dispersions can be observed as the hydrocarbon chain length is increased. The color development is most pronounced in montmorillonites where ion substitution in the crystal lattice generates color centers upon solvation of the clay surface. The color development is due to the presence of $Fe^{2+}/Fe^{3+}$ color centers in the clay crystal lattice. The ratio of the iron oxidation state affects the color, and the degree of particle surface wetting affects the color intensity. Ferrous containing aluminosilicates are generally colorless to blue, while ferric containing aluminosilicates are yellow to tan. A combination of oxidation states give rise to a mixture of blue and yellow color centers which produces and overall green coloration. The color intensity is a function of the degree of electron transfer between the $Fe^{2+}/Fe^{3+}$ color centers which in turn will be a function of iron concentration and redox state. Wetting and dispersion of the organoclay by oil or polyolefins intensifies the underlying color of the organoclay by reducing the surface scattering of light. A change in the oxidation ratio of $Fe^{2+}/Fe^{3+}$ will produce a change in color as well as a change in ion exchange capacity of the clay. Strong oxidizing conditions and its effect on the redox state of the clay can be expected to result in a reduced exchange capacity. A loss in exchange capacity has a detrimental effect on the ability to disperse and exfoliate the organoclay in solvents and hydrophobic polymers such as the polyolefins. A convenient method to inhibit the decrease in the $Fe^{2+}/Fe^{3+}$ ratio is to incorporate an antioxidant into the organoclay This may be done by combining an appropriate antioxidant with the onium ion during the ion exchange reaction. Examples include, but are not limited to, vitamin E, monophenols, such as 2,6-di-tert-butyl-4-methylphenol, octadecyl 3,5-di-tert-butyl-4-hydroxyhydrocinnamate, diphenols, such as 2,2-methylene bis(4-methyl-6-tert butylphenol), hindered phenols, such as 2,6-di-tert-butyl-p-cresol, 2,2'-methylene bis(6-tert-butyl-p-cresol), 1,3,5-trimethyl-2,4,6-tris(3',5-di-tert-butyl-4-hydroxybenzyl)benzene, tetrakis[methylene (3,5-di-tert-butyl-4-hydroxy-hydrocinnamate)]methane. Typical concentrations of antioxidant used are 0.01–0.5 weight percent relative to the weight of the organoclay for applications where the organoclay is to be dispersed into thermoplastic resins such as the polyolefins and slightly higher levels of 0.5–3 weight percent for applications where the organoclay is to be dispersed into unsaturated elastomers and ABS.

Dispersing an organoclay prepared from a Wyoming montmorillonite which contains iron in the crystal lattice of the clay (e.g., Cloisite® 20A) produces a white opaque dispersion in hexane because of poor wetting of the organoclay surface. (The dispersion is white because the particle size of the clay aggregates is well above nanometer size and is large enough to scatter visible light.) When the organoclay is dispersed in dodecane, a slight green color appears. The intensity of the color increases with increasing hydrocarbon chain length and in mineral oil, a dark forest green color appears. However, as the hydrocarbon chain length is increased still further, the color begins to subside. Dispersing Cloisite® 20A in paraffin wax produces a slight brown color, while combining with linear, low-density polyethylene produces a white, opaque dispersion. Again, the dispersion is white because the organoclay aggregates are large enough to scatter light. In contrast, the present organophyllosilicates, when dispersed under identical conditions of temperature and shear, produced dark green colors when dispersed in hydrocarbons beginning at a chain length of 12 C atoms, all the way up to and including polyethylene.

One use of the present composite materials is in automobile applications. Composite materials provide significant weight reductions and help improve gas mileage. There is also a cost advantage to the replacement of metals by plastics. While the cost of plastics on a weight basis may be equal to or greater than the cost for metals such as steel or aluminum, their cost on a volume basis is often ⅛th to ¼th the cost of metals. This is a direct result of the lower density of plastics versus metals. The last metal parts in automobiles to be replaced by plastics are body panels. While dispersion of mineral fillers on a micron scale can bring the strength and stiffness of plastics to levels that are close to some metals, this is achieved only at high mineral loadings (e.g., 40–50 weight percent) which negates most of the density advantage of polyolefins. The present composite materials achieve these physical characteristics at significantly lower loading amounts, typically on the order of ten percent or less.

EXAMPLES

The following non-limiting examples serve to further illustrate advantages of the disclosed invention.

In each example below, the settling volume of the organoclay in heptane was measured to illustrate the superior swelling and dispersion capabilities of the organoclays produced by this invention. The measurements were obtained as follows. Ground organoclay powder was added slowly in portions to heptane in a graduated cylinder and each portion was allowed to solvate and settle before adding the next. After the sample addition was completed, the cylinder was inverted 30 times to disperse the organoclay. After one hour, the settling volume of the solids was recorded as mL per gram of organoclay. This procedure was used as an indication of both the swelling volume and the ease of dispersion of the organoclay. The settling volume after one hour was used as an indication of the ease of dispersion since the settling rate is expected to be a function of particle size distribution created during inversion of the cylinder. The values reported are not considered absolute measurements since initial particle size distribution and slight variations in the rate of addition can affect the settling rates and volumes. The values reported are therefore meant to provide an indication of relative performance. An attempt to measure the swelling volume in toluene was unsuccessful due to the fact that the organoclays of this invention dissolved completely and produced transparent solutions. A comparative example using the commercially available organoclay Cloisite® 15A is provided as a basis for comparison with prior technology. (A product of Southern Clay Products, Cloisite 15A is a montmorillonite clay modified with 125 milliequivalents of dimethyl dihydrogenated tallow ammonium chloride per 100 g of clay.) Cloisite 15A is sold as a plastics additive is intended to improve various physical properties such as reinforcement and heat distortion temperature. The ability to disperse in hydrophobic polymers is a critical aspect of its performance. The basal spacing and the settling volume for each of the clays produced according to the examples below are listed for comparison in table 1 at the end of the examples section.

Example 1

This example illustrates the effect of edge treatment on the dispersion of an organoclay in polyethylene. An organophilic clay was prepared from a commercially available, water-washed montmorillonite (Cloisite Na® is a product of Southern Clay Products). The cation exchange capacity (CEC) of Cloisite Na® was estimated from the exchangeable sodium concentration of the clay. From this measurement, the CEC of Cloisite Na® is extimated to be about 124 meq per 100 g clay, dry basis. The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyldiphosphonate added was 3 weight percent relative to the weight of the dry clay. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. The concentration of the aqueous quaternary amine solution was 8 weight percent and was maintained at 70° C. Mixing of the clay suspension was continued for one hour after all of the quaternary amine salt was added. The suspension was vacuum filtered, redispersed in deionized water at 60° C. and refiltered. The extremely hydrophobic organoclay was easy to filter and when dried at ambient temperature overnight produced a −200 mesh powder. The organoclay was further dried under vacuum at 70° C. to produce a product with less than 1 weight percent moisture. The basal spacing of the product, as measured by x-ray diffraction, was 33 Å. When this material was blended with low-density polyethylene containing 1000 ppm Irganox® B225 (a product of Ciba Specialty Chemicals Corp.) at a clay loading of 10 weight percent and a temperature of 170° C., it produced a clear, light-green composite. The color development is an indication of the surface wetting and a high degree of dispersion of the organoclay by the polymer. The green color is due to the underlying color of the clay crystal lattice due to the presence of $Fe^{2+}/Fe^{3+}$ color centers. This is in contrast with the behavior of conventional organoclays such as Cloisite® 15A (a product of Southern Clay Products) which produced an opaque dispersion that was white. In this case the opacity and white coloration is due to the poor wetting of the organoclay and the presence of non-dispersed clay aggregates that are large enough to scatter light.

Example 2

This example illustrates the use of a polar polymer, in conjunction with onium exchange, to produce a hydrophobic clay surface with increased basal spacing. An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyldiphosphonate added was 3 weight percent relative to the weight of the dry clay. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternary amine was an amount of poly(ethylene glycol) equivalent to 4 weight percent relative to the dry weight of the clay. The molecular weight of the poly(ethylene glycol) was 1450. The poly(ethylene glycol) functions as a hydrotrope and nonvolatile polar activator. Mixing of the clay suspension was continued for one hour after all of the quaternary amine salt was added. The suspension was vacuum filtered, redispersed in deionized water at 60° C. and refiltered. The extremely hydrophobic organoclay was easy to filter and when dried at ambient temperature overnight produced a −200 mesh powder. The organoclay was further dried under vacuum at 70° C. to produce a product with less than 1 weight percent moisture. The basal spacing of the product, as measured by x-ray diffraction, was approximately 36.5 Å. When this material was blended with low density polyethylene containing 1000 ppm Irganox® B225 (a product of Ciba Specialty Chemicals Corp.) at a loading of 10 weight percent and a temperature of 170° C., it produced a clear, green composite that was slightly darker in color than the composite of Example 1.

Example 3

This example illustrates the use of a slightly less polar polymer, in conjunction with onium exchange, to produce a hydrophobic clay surface with increased basal spacing. An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyl diphosphonate added was 3 weight percent relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternaly amine was an amount of poly(propylene glycol) equivalent to 4 weight percent relative to the dry weight of the clay. The molecular weight of the poly(propylene glycol) was 1000. Mixing of the clay suspension was continued for one hour after all of the quaternary amine salt was added. The suspension was vacuum filtered, redispersed in deionized water at 60° C. and refiltered. The extremely hydrophobic organoclay was easy to filter and when dried at ambient temperature overnight produced a −200 mesh powder. The organoclay was further dried under vacuum at 70° C. to produce a product with less than 1 weight percent moisture. The basal spacing of the product, as measured by x-ray diffraction, was approximately 36.5 Å. When this material was blended with low density polyethylene containing 1000 ppm Irganox® B225 (a product of Ciba Specialty Chemicals Corp.) at a clay loading of 10 weight percent and a temperature of 170° C., it produced a clear, dark, emerald-green composite.

Example 4

An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxyhexane-1,1-diphosphonic acid. The amount of ammonium alkyl diphosphonate added was 3 weight percent relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 93 milliequivalents per 100 g clay was added over a period of one hour. Combined with the quaternary amine was an amount of poly(ethylene glycol) equivalent to 4 weight percent relative to the dry weight of the clay. The molecular weight of the poly(ethylene glycol) was 1450. Mixing of the clay suspension was continued for one hour after all of the quaternary amine salt was added. The suspension was vacuum filtered, redispersed in deionized water at 60° C. and refiltered. The extremely hydrophobic organoclay was easy to filter and when dried at ambient temperature overnight produced a –200 mesh powder. The organoclay was further dried under vacuum at 70° C. to produce a product with less than 1 weight percent moisture. The basal spacing of the product, as measured by x-ray diffraction, was approximately 30.1 Å. When this material was blended with low density polyethylene containing 1000 ppm Irganox® B225 (a product of Ciba Specialty Chemicals Corp.) at a loading of 10 weight percent and a temperature of 170° C. it produced a clear, green composite. The basal spacing of the organoclay is larger than conventional organoclays such as Cloisite® 20A manufactured by Southern Clay Products. Even though the commercial product has a slightly higher quaternary amine loading (95 meq/100 g versus 93 meq/100 g in this example) the basal spacing of Cloisite® 20A is only 24.2 Å. The basal surface of the clay in the present example is thus activated where in the alkyl chains of the quaternary amine are lifted from the surface of the clay.

Example 5

This example illustrates the use of a slightly less polar polymer, in conjunction with onium exchange, to produce a hydrophobic clay surface with increased basal spacing. An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyl diphosphonate added was 3 weight percent relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternary amine was an amount of polyethylene-block-poly(ethylene glycol) equivalent to 4 weight percent relative to the dry weight of the clay. The molecular weight of the polyethylene-block-poly(ethylene glycol) was 2250. Mixing of the clay suspension was continued for one hour after all of the quaternary amine salt was added. The suspension was vacuum filtered, redispersed in deionized water at 60° C. and refiltered. The extremely hydrophobic organoclay was easy to filter and when dried at ambient temperature overnight produced a –200 mesh powder. The organoclay was further dried under vacuum at 70° C. to produce a product with less than 1 weight percent moisture. The basal spacing of the product, as measured by x-ray diffraction, was approximately 35.9 Å. When this material was blended with low density polyethylene containing 1000 ppm Irganox® B225 (a product of Ciba Specialty Chemicals Corp.) at a clay loading of 10 weight percent and a temperature of 170° C., it produced a clear, very dark, emerald-green composite.

Example 6

Examples 6 and 7 illustrate the effect of edge modification on a naturally hydrophobic phyllosilicate. An organophilic talc was prepared from a commercially available, water-washed talc (Talc-9102 from Polar Minerals). A 30 weight percent dispersion in water was prepared by high-shear mixing. The edge of the talc particles was modified by addition of an aqueous solution of ammonium salt of 1-hydroxydodecane-1,1-diphosphonic acid. The amount of the ammonium alkyl diphosphonate added was 5 weight percent relative to the weight of the dry phyllosilicate. The slurry was mixed for 30 minutes and dried at 40° C. overnight. When this material was blended with polypropylene containing 1000 ppm Irganox® B225 (a product of Ciba Specialty Chemicals Corp.) at a talc loading of 10 weight percent and a temperature of 220° C., it produced a clear, colorless composite. The composite was colorless because of a lack of color centers in the mineral, and was transparent because of the high degree of dispersion and exfoliation. Without edge modification, the talc produces a white, opaque dispersion when blended with polypropylene under the same conditions.

Example 7

An organophilic talc was prepared from a commercially available, water-washed talc (Talc-9102 from Polar Minerals). A 30 weight percent dispersion in water was prepared by high-shear mixing. The edge of the talc particles was modified by addition of an aqueous solution of the fluorocarbon-based surfactant Zonyl FSP (a product of Du Pont). The amount of the surfactant added was 3 weight percent relative to the weight of the dry phyllosilicate. The slurry was mixed for 30 minutes and dried at 40° C. overnight. The basal spacing of the treated talc was 9.3 Å which is unchanged from the initial value before treatment. The lack of change in basal spacing indicates that the surfactant attaches preferentially to the edge of the phyllosilicate crystal. When this material was blended with polyethylene containing 1000 ppm Irganox® B225 (a product of Ciba Specialty Chemicals Corp.) at a talc loading of 4 weight percent and a temperature of 220° C., it produced a clear, colorless composite. The composite was colorless because of a lack of color centers in the mineral, and was transparent because of the high degree of dispersion and partial exfoliation. Measurement of water transport across an extruded composite film was approximately 5 to 8 times lower than an unfilled polyethylene reference film.

Example 8

Examples 8 through 18 illustrate the effect of various surface treatments on the swelling volume of the organoclay. The present example demonstrates that the diphosphonate surfactant modifier adsorbs preferentially at the edge of the clay crystal lattice due to a lack of change in the basal spacing upon edge treatment. An organoclay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyl diphosphonate added was 3 weight percent relative to the weight of the dry phyllosilicate. The organoclay was separated, washed with water and dewatered using a filter press, and finally dried overnight at 60° C. The basal spacing of the treated clay was 11.7 Å which is identical to the basal spacing of the untreated clay.

Example 9

The present example also demonstrates that the diphosphonate surfactant modifier adsorbs preferentially at the edge of the clay crystal lattice due to a lack of change in the basal spacing upon edge treatment. An organoclay was prepared from a commercially available, saponite (product of GSA Resources). The clay was dispersed in 40° C. tap water centrifuged to remove mineral impurities to produce a final solids concentration of 2.5 weight percent. The edge of the clay was modified by addition of an aqueous solution of the ammonium salt of 1-hydroxydodecane-1,1-diphosphonic acid. The amount of ammonium alkyl diphosphonate added was 3 weight percent relative to the weight of the dry phyllosilicate. The organoclay was separated, washed with water and dewatered using a filter press, and finally dried overnight at 60° C. The basal spacing of the treated clay was identical to the basal spacing of the untreated clay.

Example 10

An organophilic clay was prepared from a commercially available, saponite (a product of GSA Resources). From an analysis of the concentration of exchangeable cations of the clay, the CEC of the purified clay is estimated to be approximately 95 meq per 100 g of clay, dry basis. The purified clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyl diphosphonate added was 3 weight percent relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 95 milliequivalents per 100 g clay was added over a period of one hour. Combined with the quaternary amine was an amount of poly(propylene glycol) equivalent to 4 weight percent relative to the dry weight of the clay. The molecular weight of the poly(propylene glycol) was 3500. Mixing of the clay suspension was continued for one hour after all of the quaternary amine salt was added. The suspension was filtered, re-dispersed in deionized water at 60° C. and finally dewatered using a filter press. The extremely hydrophobic organoclay was easy to filter and when dried at ambient temperature overnight produced a −200 mesh powder. The basal spacing of the product, as measured by x-ray diffraction, was approximately 37.3 Å.

Example 11

Examples 11 through 13 illustrate the effect of varying the molecular weight of the edge modifying surfactant. As the HLB value of the edge modifying surfactant is increased, the swelling volume of the resulting organoclay product is reduced. This is believed to result from the overall change in the surface HLB value of the organoclay and progressive increase in the hydrophilicity of the clay edge. An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyl diphosphonate added was 3 weight percent relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternary amine was an amount of poly(propylene glycol) equivalent to 4 weight percent relative to the dry weight of the clay. The molecular weight of the poly(propylene glycol) was 1000. Mixing of the clay suspension was continued for one hour after all of the quaternary amine salt was added. The suspension was filtered, redispersed in deionized water at 60° C. and finally dewatered using a filter press. The extremely hydrophobic organoclay was easy to filter and when dried at ambient temperature overnight produced a −200 mesh powder. The basal spacing of the product, as measured by x-ray diffraction, was approximately 36 Å.

Example 12

An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxyhexane-1,1-diphosphonic acid. The amount of ammonium alkyl diphosphonate added was 2.3 weight percent relative to the weight of the dry phyllosilicate. The weight of surfactant used was reduced to compensate for the decreased molecular weight and to maintain a constant milliequivalent ratio. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternary amine was an amount of poly(propylene glycol) equivalent to 4 weight percent relative to the dry weight of the clay. The molecular weight of the poly(propylene glycol) was 1000. Mixing of the clay suspension was continued for one hour after all of the quaternary amine salt was added. The suspension was filtered, re-dispersed in deionized water at 60° C. and finally dewatered using a filter press. The extremely hydrophobic organoclay was easy to filter and when dried at ambient temperature overnight produced a −200 mesh powder. The basal spacing of the product, as measured by x-ray diffraction, was approximately 36 Å. The reduced molecular weight of the edge modifying surfactant had no effect on the basal spacing of the organoclay product.

Example 13

An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxybutane-1,1-diphosphonic acid. The amount of ammonium alkyl diphosphonate added was 2.0 weight percent relative to the weight of the dry phyllosilicate. The weight of surfactant used was reduced to compensate for the decreased molecular weight and to maintain a constant milliequivalent ratio. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternary amine was an amount of poly(propylene glycol) equivalent to 4 weight percent relative to the dry weight of the clay. The molecular weight of the poly(propylene glycol) was 1000. Mixing of the clay suspension was continued for one hour after all of the quaternary amine salt was added. The suspension was filtered, re-dispersed in deionized water at 60° C. and finally dewatered using a filter press. The extremely hydrophobic organoclay was easy to filter and when dried at ambient temperature overnight produced a –200 mesh powder. The basal spacing of the product, as measured by x-ray diffraction, was approximately 36 Å. The reduced molecular weight of the edge modifying surfactant had no effect on the basal spacing of the organoclay product. However, it did have a dramatic effect on the settling volume of the organoclay in heptane. This is shown in Table 1, where the settling volume is lower than prior art of Comparative Example A, but better than Comparative Examples B, and C.

Example 14

An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyl diphosphonate added was 3 weight percent relative to the weight of the dry phyllosilicate. The weight of surfactant used was reduced to compensate for the decreased molecular weight and to maintain a constant milliequivalent ratio. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternary amine was an amount of poly(tetrahydrofuran) equivalent to 4 weight percent relative to the dry weight of the clay. The molecular weight of the poly(tetrahydrofuran) was 1000. Mixing of the clay suspension was continued for one hour after all of the quaternary amine salt was added. The suspension was filtered, re-dispersed in deionized water at 60° C. and finally dewatered using a filter press. The extremely hydrophobic organoclay was easy to filter and when dried at ambient temperature overnight produced a –200 mesh powder. The basal spacing of the product, as measured by x-ray diffraction, was approximately 34.5 Å.

Example 15

This example illustrates the use of an antioxidant to prevent an increase in the oxidation state of the $Fe^{2+}/Fe^{3+}$ color centers. An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of bis(2,4,4-trimethylpentyl)phosphinic acid. The amount of ammonium alkyl phosphinate added was 2.8 weight percent relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternary amine was an amount of poly(propylene glycol) monobutyl ether equivalent to 4 weight percent relative to the dry weight of the clay. The molecular weight of the poly(propylene glycol)monobutyl ether was 1000. Also combined with the quaternary amine was Irganox® B225 (a product of Ciba Specialty Chemicals Corp.) equivalent to 2000 ppm relative to the weight of the organoclay product. Mixing of the clay suspension was continued for one hour after all of the quaternary amine salt was added. The suspension was filtered, re-dispersed in deionized water at 60° C. and finally dewatered using a filter press. The extremely hydrophobic organoclay was easy to filter and when dried at ambient temperature overnight produced a –200 mesh powder. The color of the organoclay product had a noticeably darker green color than the corresponding organoclays prepared without the antioxidant. The basal spacing of the product, as measured by x-ray diffraction, was approximately 35.1 Å. The settling volume in heptane (Table 1) was 37 mL/g and is more than double the value of Comparative Example A in which the anionic surfactant is complexed by the quaternary amine.

Example 16

This example illustrates the use of an antioxidant to prevent an increase in the oxidation state of the $Fe^{2+}/Fe^{3+}$ color centers. An organophilic clay was prepared from a commercially available, water-washed montmorillonite (Cloisite Na®). The clay was dispersed in 40° C. tap water at a solids concentration of 2.5 weight percent by high-shear mixing for 40 minutes. The edge of the clay was modified by addition of an aqueous solution of the ammonium salt of bis(2-ethylhexyl)hydrogen phosphate. The amount of ammonium alkyl phosphate added was 3.0 weight percent relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available from AKZO Nobel) equivalent to 110 milliequivalents per 100 g clay was added over a period of one hour. Combined with the quaternary amine was an amount of poly(propylene glycol) monobutyl ether equivalent to 4 weight percent relative to the dry weight of the clay. The molecular weight of the poly(propylene glycol)monobutyl ether was 1000. Also combined with the quaternary amine was Irganox® B225 (a product of Ciba Specialty Chemicals Corp.) equivalent to 2000 ppm relative to the weight of the organoclay product. Mixing of the clay suspension was continued for one hour after all of the quaternary amine salt was added. The suspension was filtered, re-dispersed in deionized water at 60° C. and finally dewatered using a filter press. The extremely hydrophobic organoclay was easy to filter and when dried at ambient temperature overnight produced a −200 mesh powder. The color of the organoclay product had a noticeably darker green color than the corresponding organoclays prepared without the antioxidant. The basal spacing of the product, as measured by x-ray diffraction, was approximately 35.1 Å. The settling volume in heptane (Table 1) was approximately twice the value of Comparative Example A in which the anionic surfactant is complexed by the quaternary amine.

Example 17

This example illustrates the use of edge treatment to render a synthetic phyllosilicate compatible with water/alcohol mixtures. An aqueous dispersion containing 6 weight percent Laponite®, a synthetic smectite clay, (a product of Laporte Industries) was prepared in distilled water with high shear mixing. After hydration of synthetic clay, the edge of the clay was treated with the ammonium salt of 1-hydroxydodecyl-1,1-diphosphonic acid at a concentration of 4.5 weight percent, relative to the dry weight of the clay. After mixing for 5 minutes, ethanol was added to the clay/water dispersion until the dispersion was no longer stable and the clay began to flocculate. Stable, clear gels were thus produced with ethanol concentrations up to 80 weight percent.

Example 18

This example illustrates the use of edge treatment together with modification of the basal surface to render a synthetic phyllosilicate compatible with water/alcohol mixtures containing ethylene vinyl alcohol polymers (EVOH). Dispersion of clays in these solvent systems can be used to produce EVOH composite materials. An eleven weight percent organoclay dispersion was prepared by hydrating Laponite® in deionized water with high shear mixing, followed by addition of methoxy polyethylene glycol having a molecular weight of 5,000. The dispersion was mixed an additional 30 minutes to complete adsorption of the polymer to the basal surface of the clay. The weight ratio of polymer to clay was 0.3. The methoxy polyethylene glycol serves two purposes. Its molecular weight is low enough to allow it to function as a dispersant, thereby reducing the viscosity, and by attaching to the basal surface reduces the surface HLB value. The edge of the hydrophilic organoclay was then reacted with the ammonium salt of 1-hydroxydodecyl-1,1-diphosphonic acid at a concentration of 3 weight percent relative to the dry weight of the clay. The edge modified organoclay was then mixed with n-propanol to bring the organoclay concentration in the water/alcohol mixture to 7 weight percent. The clear, stable clay dispersion was then combined with EVOH that was dispersed in a 65:35 mixture of n-propanol and water. The ratio of the two dispersions was such to produce a 7 weight percent clay concentration in the final composite material. The clay/polymer combination was mixed for 1 hour at 1800 rpm with a marine-type impeller. The dispersion was then dried in an oven overnight at 80° C. to remove the solvent system. The dried composite material was ground into a fine powder and then pressed into a film at 180° C. The composite material film was transparent and colorless and x-ray analysis showed no basal reflection. The x-ray data in FIG. 1 indicate that the clay was substantially exfoliated.

Example 19

Figure 2:
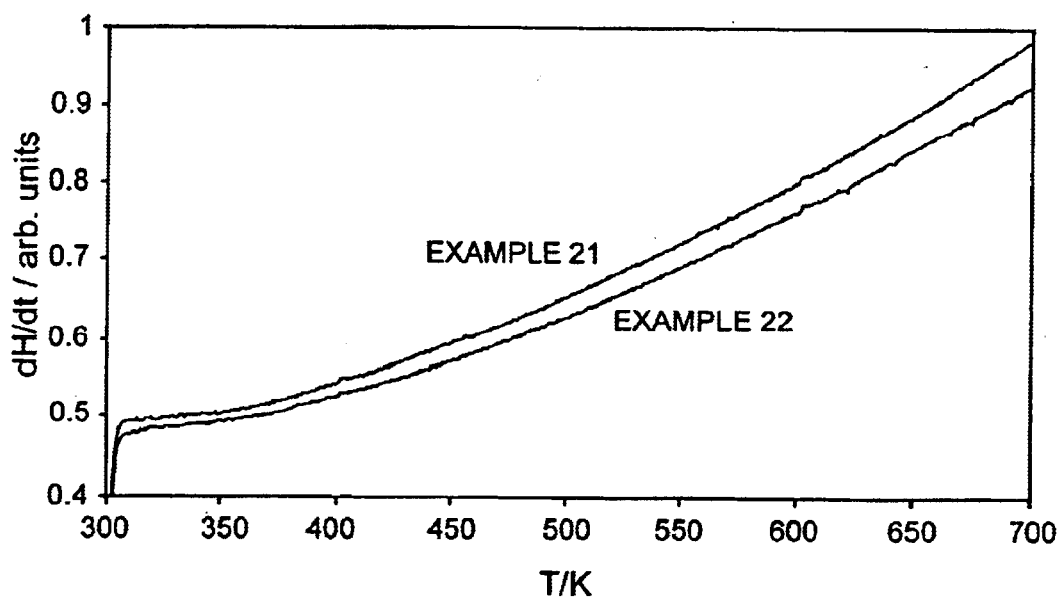
FIG. 2 is a DSC trace for the talc samples of Examples 19 and 20.

The preparation and processing of thermoplastic composite materials involves high temperature mixing of the organoclay with the polymer melt to achieve exfoliation of the organoclay. The melt/mixing temperatures of polyolefins typically range between 190 to 240° C. However, much higher temperatures are commonly used in extrusion coating applications. For example, temperatures in the vicinity of 300 to 320° C. are commonly used in the extrusion coating of low density polyethylene (LDPE). A significant problem with organoclays produced by prior art methods has been the poor thermal stability of the surfactant coatings. In this example the thermal stability of the edge chemistry is illustrated by differential scanning calorimetry (DSC) measurements of edge treated talc. A 30 weight percent dispersion of talc (9102 from Polar Minerals) was prepared in deionized water with high shear mixing. The ammonium salt of 1-hydroxydodecyl-1,1-diphosphonic acid was added to the talc dispersion at a concentration of 3 weight percent relative to the dry weight of talc. The dispersion was mixed for 30 minutes and then dried at 80° C. overnight. The exceptional thermal stability of the edge surfactant is demonstrated in FIG. 2 where a DSC trace to 700 K. (427° C.) failed to show any sign of the thermal degradation of the surfactant.

Example 20

In this example the edge of the talc was treated with the ammonium salt of bis (2,4,4-trimethylpentyl)phosphinic acid (Cyanex 272, a product of Cytec Canada, Inc.). A 30 weight percent dispersion of talc (9102 from Polar Minerals) was reacted with the ammonium salt of bis (2,4,4-trimethylpentyl)phosphinic acid at a concentration of 2 weight percent relative to the weight of the talc. The dispersion was mixed for 30 minutes and dried at 80° C. overnight. The exceptional thermal stability of the edge surfactant is demonstrated in FIG. 2 where a DSC trace to 700 K. (427° C.) failed to show any sign of thermal degradation of the surfactant.

Example 21

Figure 3:
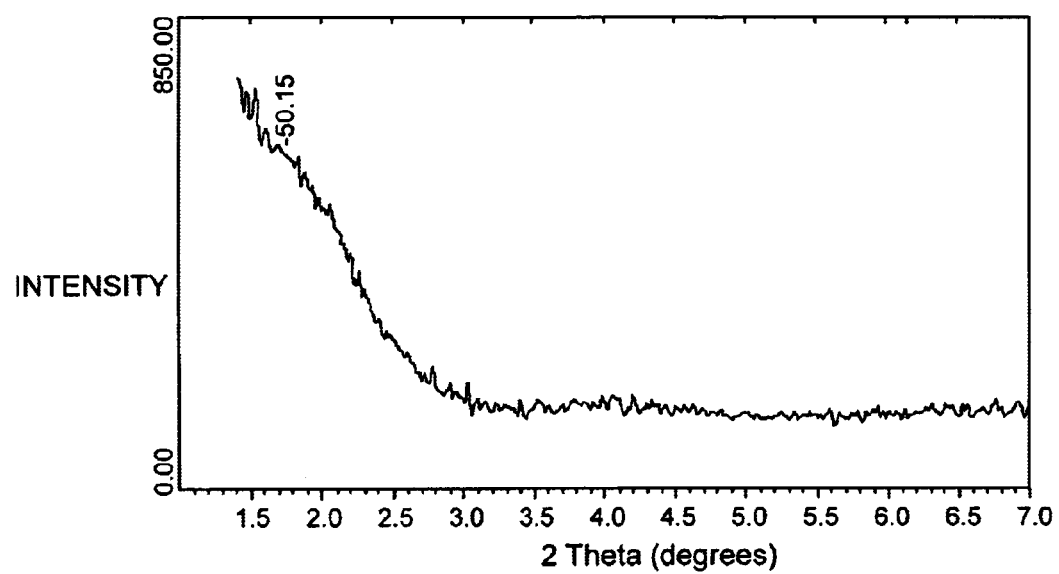
FIG. 3 is an x-ray diffraction pattern of the organoclay/wax composite prepared according to Example 21.

This example illustrates the ability to prepare the invented organoclays as an extrudable master batch containing 70 weight percent organoclay. The master batch can be prepared as a palletized product for later mixing with thermoplastic polyolefins to produce composite materials. The organoclay of Example 1, which does not contain a hydrotropic activator on the basal surface, was blended with a semicrystalline wax; polyethylene-block-polyethylene glycol with a molecular weight of 575 and an HLB value of 4.0, at a clay to surfactant ratio of 70:30. The wax itself is a hydrotrope and can simultaneously activate the basal surface of the organoclay and swell the galleries. Mixing the clay with the surfactant at 130° C. produced a dark green composite with expanded basal spacing in the range of 50–60 Å. The x-ray pattern of the transparent, extrudable LLC phase is shown in FIG. 3. In this case, the color development is an indication of the surface wetting and high degree of dispersion of the organoclay. Pressed films of the masterbatch were transparent and is an indication of the excellent flow properties of the organoclay composite.

The high swelling efficiency of this system is in stark contrast to the reported performance of conventional organoclays. In one published study representing prior art, the intercalation of an epoxy oligomer produced only minimal expansion of the organoclay galleries into the range of 19–23 Å even though the ratio of oligomer to clay was at least 10 fold higher than in the present example. Typically, oligomer/clay ratios in excess of 5:1 have been required to increase basal spacing in excess of 60 Å. Apparently, not all of the oligomer is adsorbed onto the galleries of the organoclay.

Example 22

To illustrate the superior dispersion capabilities of the master batch of Example 21, an organoclay/wax LLC was prepared, as in Example 21, but with 50 weight percent wax instead of 30. The master batch was then blended with LDPE at 180° C. in a Plasti-Corder. The masterbatch was blended with enough LDPE to reduce the clay concentration to approximately 20 weight percent. The material had a dark green color due to the excellent surface wetting of the clay by the polyolefin. The material was pressed into a thin film and oxygen transmission rate was measured at room temperature. The measured oxygen permeability of the film was $0.5 \times 10^{-7}$ mol/(m·s·Pa). The measured barrier properties of the film are comparable with that of Nylon 6 which is considered to be a good barrier towards oxygen. The permeability of the film is 100–200 times lower than the literature values for LDPE alone, and 10,000 times lower than the measured value for paraffin wax.

Example 23

To further illustrate the superior dispersion capabilities of organoclays incorporating hydrotropes together with edge treatment, the clay of Example 2 was dispersed in polybutadiene having a molecular weight of approximately 3000 by gently mixing the clay with the polymer at room temperature and at an organoclay concentration of 20 weight percent. After 30 s mixing, the material was heated at 70° C. overnight without further mixing. The initial mixing was incomplete and a large number of visible clay agglomerates were still present prior to heating. In this example, a simple annealing process was sufficient to produce a transparent, exfoliated product. Repeating this process with Cloisite 15A failed to produce any significant clay dispersion.

Comparative Example A

For comparative purposes, the ability of alternative anionic surfactants, such as those disclosed in U.S. Pat. No. 4,434,075, to produce self-activated organoclays is illustrated in this example. This example uses a carboxylic acid instead of the surfactants which preferentially adsorb onto the edge of phyllosilicates as described in the present invention. An organophilic clay was prepared from a commercially available, water-washed montmorillonite (Cloisite Na®). The clay was dispersed in 40° C. tap water at a solids concentration of 2.5 weight percent by high-shear mixing for 40 minutes. The clay was modified by addition of an aqueous solution of the sodium salt of stearic acid. The amount of sodium stearate added was 22.5 milliequivalents relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available from AKZQ Nobel) equivalent to 122.5 milliequivalents per 100 g clay was added over a period of one hour. Mixing of the clay suspension was continued for one hour after all of the quaternary amine salt was added. The suspension was filtered, re-dispersed in deionized water at 60° C. and finally dewatered using a filter press. The moderately hydrophobic organoclay was dried at ambient temperature overnight and produced a −200 mesh powder. The basal spacing of the product, as measured by x-ray diffraction, was approximately 34.1 Å.

Comparitive Example B

For comparative purposes, the ability of alternative anionic, polymeric dispersants, such as those disclosed in U.S. Pat. No. 6,271,298, for treating the edge of a smectite clay. This example uses a polymeric carboxylic acid instead of the surfactants described in the present invention. An organophilic clay was prepared from a commercially available, water-washed montmorillonite (Cloisite Na®). The clay was dispersed in 40° C. tap water at a solids concentration of 2.5 weight percent by high-shear mixing for 40 minutes. The clay was modified by addition of an aqueous solution of the sodium salt of polyacrylic acid (Tamol 731A, a product of Rhom & Haas). The amount of polyacrylic acid added was 1.2 weight percent relative to the weight of the dry phyllosilicate. Following equilibration for 30 minutes, the temperature of the slurry was increased to 70° C. and an amount of dimethyl dihydrogenated tallow ammonium chloride (Arquad 2HT-75, a quaternary amine salt commercially available form AKZO Nobel) equivalent to 110 milliequivalents per 100 g clay was added over a period of one hour. Combined with the quaternary amine was an amount of poly(propylene glycol) equivalent to 4 weight percent relative to the dry weight of the clay. The molecular weight of the poly(propylene glycol) was 1000. Mixing of the clay suspension was continued for one hour after all of the quaternary amine salt was added. The suspension was filtered, re-dispersed in deionized water at 60° C. and finally dewatered using a filter press. The slightly hydrophobic organoclay was dried at ambient temperature overnight and produced a −200 mesh powder. The basal spacing of the product, as measured by x-ray diffraction, was approximately 33.2 Å. The equivalent organoclay of Example 11 produced a swelling volume in heptane that was approximately 2.8 times larger than the present example.

Comparative Example C

For comparative purposes, the swelling performance of conventional organoclay is provided in Table 1. This example uses Cloisite 15A. The relatively poor swelling performance of this organoclay, compared with the equivalent organoclay of Example 1, is listed in Table 1 which also shows the effect of edge treatment. The present comparative example produced a settling volume in heptane that was only 6.5 mL/gm.

TABLE 1

|  | MER | D(001), Å | Settling Volume, ML/g |
|---|---|---|---|
| Example 1 | 110 | 33.0 | 19.0 |
| Example 8 | 0 | 11.7 | 1.5 |
| Example 9 | 0 | 13.0 | 1.5 |
| Example 10 | 95 | 37.3 | 19.0 |
| Example 11 | 110 | 36.0 | 20.5 |
| Example 12 | 110 | 36.0 | 20.9 |
| Example 13 | 110 | 36.0 | 12.8 |
| Example 14 | 110 | 34.7 | 51.5 |
| Example 15 | 110 | 35.1 | 37.0 |
| Example 16 | 110 | 35.1 | 35.5 |
| Comp. Ex. A | 122.5 | 34.1 | 18.0 |
| Comp. Ex. B | 110 | 33.2 | 7.3 |
| Comp. Ex. C | 125 | 31.5 | 6.5 |

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

While preferred embodiments have been illustrated and described, it should be understood that changes and modifications can be made therein in accordance with ordinary skill in the art without departing from the invention in its broader aspects as defined in the following claims.

What is claimed is:

1. An edge modified organophyllosilicate, comprising:
   (a) a phyllosilicate; and
   (b) an edge modifying surfactant adsorbed onto the edge of the phyllosilicate to form an edge modified phyllosilicate having a hydrophobic edge;
   wherein the edge modified phyllosilicate is organophilic.

2. The edge modified organophyllosilicate of claim 1 wherein the surface of the phyllosilicate is free of surface HLB modifying agent.

3. The edge modified organophyllosilicate of claim 2 wherein the phyllosilicate is an ion exchangeable phyllosilicate.

4. The edge modified phyllosilicate of claim 3 wherein the phyllosilicate is a smectite clay or mica.

5. The edge modified organophyllosilicate of claim 1 wherein the edge modifying surfactant is selected from the group consisting of organophosphorous compounds, organosulfur compounds, and combinations thereof.

6. The edge modified organophyllosilicate of claim 1 wherein the edge modifying surfactant is selected from the group consisting of phosphonic acids, phosphinic acids, phosphoric acids, phosphorous acid diesters, diphosphonic acids, pyrophosphoric acid diesters, thiophosphonic acids, dithiophosphonic acids, and combinations thereof.

7. The edge modified organophyllosilicate of claim 1 further comprising a surface HLB modifying agent adsorbed onto the surface of the phyllosilicate.

8. The edge modified organophyllosilicate of claim 7 wherein the phyllosilicate is a smectite clay or mica.

9. The edge modified organophyllosilicate of claim 7 wherein the surface HLB modifying agent is selected from the group consisting of cationic surfactants, hydrophobic oligomers containing polar functional groups having an affinity for the surface of the phyllosilicate, and hydrophobic polymers containing polar functional groups having an affinity for the surface of the phyllosilicate.

10. The edge modified organophyllosilicate of claim 7 wherein the surface HLB modifying agent is a cationic surfactant selected from the group consisting of alkyl ammonium, alkylphosphonium, alkylsulfonium, alkylisothiouronium, and mixtures thereof.

11. The edge modified organophyllosilicate of claim 1 wherein the edge modifying surfactant is adsorbed only to the edge of the phyllosilicate.

12. The edge modified organophyllosilicate of claim 1, further comprising a nonionic polymeric hydrotrope adsorbed onto the surface of the phyllosilicate.

13. The edge modified organophyllosilicate of claim 1, further comprising an antioxidant adsorbed onto the surface of the phyllosilicate.

14. A composite material, comprising:
    (a) an edge modified phyllosilicate having a surfactant adsorbed onto the edges thereof; and
    (b) a polymer,
    wherein the surfactant renders the phyllosilicate edge hydrophobic, and the edge modified phyllosilicate is dispersed throughout the polymer forming the composite material.

15. The composite material of claim 14 wherein the surface of the phyllosilicate is free of surface HLB modifying agent prior to being dispersed in the polymer.

16. The composite material of claim 15 wherein the phyllosilicate is an ion exchangeable phyllosilicate.

17. The composite material of claim 16 wherein the phyllosilicate is a smectite clay or mica.

18. The composite material of claim 14 wherein the edge modifying surfactant is selected from the group consisting of organophosphorous compounds, organosulfur compounds, and combinations thereof.

19. The composite material of claim 14 wherein the edge modifying surfactant is selected from the group consisting of phosphonic acids, phosphinic acids, phosphoric acids, phosphorous acid diesters, diphosphonic acids, pyrophosphoric acid diesters, thiophosphonic acids, dithiophosphonic acids, and combinations thereof.

20. The composite material of claim 14 further comprising a surface HLB modifying agent adsorbed onto the surface of the phyllosilicate.

21. The composite material of claim 20 wherein the phyllosilicate is a smectite clay or mica.

22. The composite material of claim 20 wherein the surface HLB modifying agent is selected from the group consisting of cationic surfactants, hydrophobic oligomers containing polar functional groups having an affinity for the surface of the phyllosilicate and hydrophobic polymers containing polar functional groups having an affinity for the surface of the phyllosilicate.

23. The composite material of claim 22 wherein the surface HLB modifying agent is a cationic surfactant selected from the group consisting of alkyl ammonium, alkylphosphonium, alkylsulfonium, alkylisothiouronium, and mixtures thereof.

24. The composite material of claim 14 wherein the edge modifying surfactant is adsorbed only to the edge of the phyllosilicate.

25. The composite material of claim 14 further comprising a nonionic polymeric hydrotrope adsorbed onto the surface of the phyllosilicate.

26. The composite material of claim 14 further comprising an antioxidant adsorbed onto the surface of the phyllosilicate.

27. The composite material of claim 14 wherein the polymer is a thermoplastic or thermoset polymer.

28. The composite material of claim 14 wherein the polymer is selected from the group consisting of polyolefins and elastomers.

29. The composite material of claim 14 wherein the polymer is selected from the group consisting of polyethylene, polypropylene, ethylene-propylene copolymers, ethylene-propylene-diene terpolymers, poly(ethylene-co-vinyl acetate), poly(ethylene-co-vinyl alcohol), poly(ethylene-co-vinyl acetate-co-methacrylic acid), poly(ethylene-co-methacrylate), poly(ethylene-co-methacrylic acid), poly(methyl methacrylate), polyisobutylene, polyisoprene, polybutadiene, poly(styrene-butadiene-styrene), poly(styrene-co-acrylonitrile), poly(acrylonitrile-co-butadiene-co-styrene), polystyrene, polyvinylchloride, cellulose acetate, cellulose acetate butyrate, cellulose propionate, and combinations thereof.

30. The composite material of claim 14 wherein the edge modified phyllosilicate is blended with a semicrystalline wax and further wherein the edge modified phyllosilicate-wax blend is dispersed throughout the polymer.

31. An extrudable organophyllosilicate composition comprising:
(a) a phyllosilicate;
(b) an edge modifying surfactant adsorbed onto the edge of the phyllosilicate; and
(c) a wax,
wherein the edge modifying surfactant renders the phyllosilicate edge hydrophobic, and the phyllosilicate is blended with the wax.

32. The extrudable organophyllosilicate composition of claim 31, further comprising a surface HLB modifying agent adsorbed onto the surface of the phyllosilicate.

33. The extrudable organophyllosilicate composition of claim 31, further comprising a nonionic polymeric hydrotrope adsorbed onto the surface of the phyllosilicate.

34. The extrudable organophyllosilicate composition of claim 31, further comprising an antioxidant adsorbed onto the surface of the phyllosilicate.

35. The extrudable organophyllosilicate composition of claim 31 wherein the wax is a natural wax selected from the group consisting of paraffin, microcrystalline montan, vegetable waxes, and mixtures thereof.

36. The extrudable organophyllosilicate composition of claim 31 wherein the wax is a synthetic wax selected from the group consisting of Fischer Tropsch waxes, polyethylene wax, polypropylene wax, ethylene/propylene copolymer waxes, chemically modified waxes, polymerized alpha olefins, and mixtures thereof.

37. The extrudable organophyllosilicate composition of claim 31 wherein the organoclay comprises between about 20 and about 75 weight percent of the composition.

38. A method for producing an organophyllosilicate comprising:
(a) dispersing a phyllosilicate in a solution containing an edge modifying surfactant; and
(b) adsorbing an edge modifying surfactant onto the edge of the phyllosilicate to form a hydrophobic edge; and
wherein the edge modified organophyllosilicate is organophilic.

39. The method of claim 38 wherein the phyllosilicate is an ion exchangeable phyllosilicate and further wherein the method does not include adsorbing a surface HLB modifying agent onto the surface of the phyllosilicate.

40. The method of claim 39 wherein the phyllosilicate is a smectite clay or mica.

41. The method of claim 38 wherein the edge modifying surfactant is selected from the group consisting of organophosphorous compounds, organosulfur compounds, and combinations thereof.

42. The method of claim 38 wherein the edge modifying surfactant is selected from the group consisting of phosphonic acids, phosphinic acids, phosphoric acids, phosphorous acid diesters, diphosphonic acids, pyrophosphoric acid diesters, thiophosphonic acids, dithiophosphonic acids, and combinations thereof.

43. The method of claim 38 further comprising adsorbing a surface HLB modifying agent onto the surface of the phyllosilicate.

44. The method of claim 43 wherein the phyllosilicate is a smectite clay or mica.

45. The method of claim 43 wherein the surface HLB modifying agent is selected from the group consisting of cationic surfactants, hydrophobic oligomers containing polar functional groups having an affinity for the surface of the phyllosilicate and hydrophobic polymers containing polar functional groups having an affinity for the surface of the phyllosilicate.

46. The method of claim 43 wherein the surface HLB modifying agent is a cationic surfactant selected from the group consisting of alkyl ammonium, alkylphosphonium, alkylsulfonium, alkylisothiouronium, and mixtures thereof.

47. The method of claim 38, further comprising adsorbing a nonionic polymeric hydrotrope onto the surface of the phyllosilicate.

48. The method of claim 38, further comprising adsorbing an antioxidant onto the surface of the phyllosilicate.

49. A method for producing a composite material, comprising:
(a) adsorbing a surfactant onto the edge of a phyllosilicate to produce a modified phyllosilicate having a hydrophobic edge; and
(b) dispersing the modified phyllosilicate in a polymer to form a composite material.

50. The method of claim 49 wherein the phyllosilicate is an ion exchangeable phyllosilicate and further wherein the method does not include adsorbing a surface HLB modifying agent onto the surface of the phyllosilicate prior to dispersing the phyllosilicate in the polymer.

51. The method of claim 50 wherein the phyllosilicate is a smectite clay or mica.

52. The method of claim 49 wherein the edge modifying surfactant is selected from the group consisting of organophosphorous compounds, organosulfur compounds, and combinations thereof.

53. The method of claim 49 wherein the edge modifying surfactant is selected from the group consisting of phosphonic acids, phosphinic acids, phosphoric acids, phosphorous acid diesters, diphosphonic acids, pyrophosphoric acid diesters, thiophosphonic acids, dithiophosphonic acids, and combinations thereof.

54. The method of claim 49 further comprising adsorbing a surface HLB modifying agent onto the surface of the phyllosilicate.

55. The method of claim 54 wherein the phyllosilicate is a smectite clay or mica.

56. The method of claim 54 wherein the surface HLB modifying agent is selected from the group consisting of cationic surfactants, hydrophobic oligomers containing polar functional groups having an affinity for the surface of the phyllosilicate and hydrophobic polymers containing polar functional groups having an affinity for the surface of the phyllosilicate.

57. The method of claim 54 wherein the surface HLB modifying agent is a cationic surfactant selected from the group consisting of alkyl ammonium, alkylphosphonium, alkylsulfonium, alkylisothiouronium, and mixtures thereof.

58. The method of claim 49 wherein the edge modifying surfactant is adsorbed only to the edge of the phyllosilicate.

59. The method of claim 49, further comprising adsorbing a nonionic polymeric hydrotrope onto the surface of the phyllosilicate.

60. The method of claim 49, further comprising adsorbing an antioxidant onto the surface of the phyllosilicate.

61. The method of claim 49 wherein the polymer is a thermoplastic or thermoset polymer.

62. The method of claim 49 wherein the polymer is selected from the group consisting of polyolefins and elastomers.

63. The method of claim 49 wherein the polymer is selected from the group consisting of polyethylene, polypropylene, ethylene-propylene copolymers, ethylene-propylene-diene terpolymers, poly(ethylene-co-vinyl acetate), poly(ethylene-co-vinyl alcohol), poly(ethylene-co-vinyl acetate-co-methacrylic acid), poly(ethylene-co-methacrylate), poly(ethylene-co-methacrylic acid), poly(methyl methacrylate), polyisobutylene, polyisoprene, polybutadiene, poly(styrene-butadiene-styrene), poly(styrene-co-acrylonitrile), poly(acrylonitrile-co-butadiene-co-styrene), polystyrene, polyvinylchloride, cellulose acetate, cellulose acetate butyrate, cellulose propionate, and combinations thereof.

64. The method of claim 49 further including blending the edge modified phyllosilicate with a semicrystalline wax and dispersing the edge modified phyllosilicate-wax blend throughout the polymer.

65. An edge modified organophyllosilicate, comprising:
   (a) a phyllosilicate; and
   (b) an edge modifying surfactant adsorbed onto the edge of the phyllosilicate to form an edge modified phyllosilicate;
   wherein the phyllosilicate is a substantially non ion exchangeable phyllosilicate, the surface of the phyllosilicate is free of surface HLB modifying agent, and the edge modified phyllosilicate is organophilic.

66. The edge modified organophyllosilicate of claim 65 wherein the phyllosilicate is a kaolinite clay or talc.

67. A composite material, comprising:
   (a) an edge modified phyllosilicate having a surfactant adsorbed onto the edges thereof; and
   (b) a polymer,
   wherein the phyllosilicate is a substantially non ion exchangeable phyllosilicate, the surface of the phyllosilicate is free of surface HLB modifying agent, and the edge modified phyllosilicate is dispersed throughout the polymer forming the composite material.

68. The edge modified organophyllosilicate of claim 67 wherein the phyllosilicate is a kaolinite clay or talc.

69. An extrudable organophyllosilicate composition comprising:
   (a) a phyllosilicate;
   (b) an edge modifying surfactant adsorbed onto the edge of the phyllosilicate; and
   (c) a semicrystalline wax selected from the group consisting of polyethylene-block-polyethylene glycol,
   wherein the phyllosilicate is blended with the wax.

70. A method for producing an organophyllosilicate comprising:
   (a) dispersing a phyllosilicate in a solution containing an edge modifying surfactant; and
   (b) adsorbing an edge modifying surfactant onto the edge of the phyllosilicate; and
   wherein the phyllosilicate is a substantially non ion exhangeable phyllosilicate, the method does not include adsorbing a surface HLB modifying agent onto the surface of the phyllosilicate, and the edge modified organophyllosilicate is organophilic.

71. The method of claim 70 wherein the phyllosilicate is a kaolinite clay or talc.

72. A method for producing a composite material, comprising:
   (a) adsorbing a surfactant onto the edge of a phyllosilicate to produce a modified phyllosilicate; and
   (b) dispersing the modified phyllosilicate in a polymer to form a composite material;
   wherein the phyllosilicate is a substantially non ion exchangeable phyllosilicate and further wherein the method does not include adsorbing a surface HLB modifying agent onto the surface of the phyllosilicate prior to dispersing the phyllosilicate in the polymer.

73. The method of claim 72 wherein the phyllosilicate is a kaolinite clay or talc.

* * * * *